July 15, 1958 C. W. DAVIS 2,843,843

USE PREVENTION CIRCUIT AND APPARATUS

Filed March 24, 1955 3 Sheets-Sheet 1

*INVENTOR.*

CECIL W. DAVIS

*BY* Edw. F. Sturston

ATTORNEY.

July 15, 1958 C. W. DAVIS 2,843,843

USE PREVENTION CIRCUIT AND APPARATUS

Filed March 24, 1955 3 Sheets-Sheet 2

INVENTOR.
CECIL W. DAVIS

BY [signature]

ATTORNEY

INVENTOR.
CECIL W. DAVIS

BY [signature]

ATTORNEY

United States Patent Office 2,843,843
Patented July 15, 1958

2,843,843

USE PREVENTION CIRCUIT AND APPARATUS

Cecil W. Davis, Montgomery, Ala.

Application March 24, 1955, Serial No. 496,535
6 Claims. (Cl. 340—276)

This invention relates to a use prevention circuit and apparatus, and is particularly concerned with the prevention of unauthorized use of an electrical system containing a switch. While the invention, as a whole, and with respect to individual elements and sub-combinations, may be broadly applicable to numerous types of circuits and various uses and environments thereof, it is especially applicable for the prevention of unauthorized use of internal combustion engines as employed in motor vehicles, boats, airplanes and the like. As here presented by way of illustration, the invention is incorporated in the ignition system of a motor vehicle and thus includes, in addition to the control of the ignition system, signal means incorporated therewith by which an attempted tampering with the vehicle, as for the purpose of circumventing the prospective effect of the system, will issue a public warning thereof.

It is an object of the present invention to provide a circuit controlling, unauthorized use prevention device of improved, simple, efficient and effective construction well designed to meet the demands of economic manufacture and one which will be rugged and durable in construction as well as readily manageable by an authorized person having knowledge of the secret formula for its operation.

Another object of the invention is to provide a device by which attempted manipulation by an unauthorized person, without adequate knowledge of the formula, will automatically preclude an attempted knowledge thereof by trial and error methods.

A further object is to provide means requiring a predetermined sequential mode of operation and incorporating therein a frustrating element precluding successful manipulation in the event of operation in other than the predetermined sequence.

It is also among the objects of the invention to provide a device operable only by the knowledge of a secret formula or sequence of operation and yet a device which avoids the use of traceable hidden keys or buttons as well as the use of complicated dial and combination means.

More specifically, it is an object of the present invention to provide a novel and improved contact key or button operated unauthorized use prevention, ignition control circuit device particularly adapted for operation thereof.

Still another more specific object of the invention is to provide a circuit control system of the type set forth incorporating therein signal means for publicly announcing an attempt to gain access to the circuit for the purpose of tampering therewith.

Numerous other objects, features and advantages of the present invention will be apparent from a consideration of the present detailed specification taken in conjunction with the accompanying drawings, in which.

Figure 1:
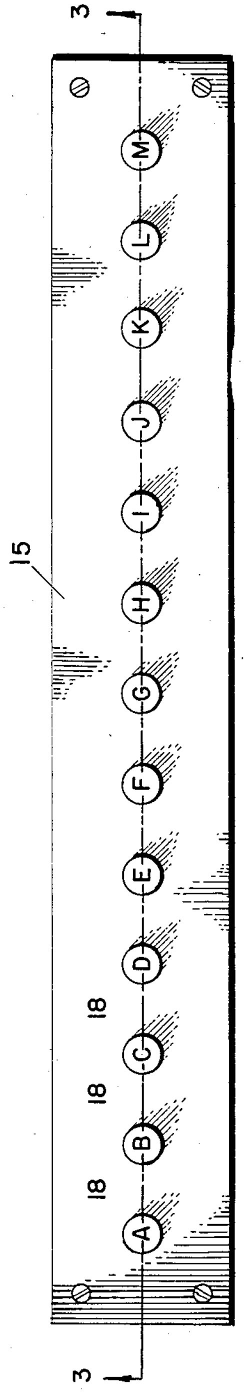
Fig. 1 is a front elevation of the keyboard or panel of one form of the present invention.

In general terms, that form of the invention herein set forth as illustrative of one embodiment of the inventive concept may be broadly defined as including a circuit controlled by one or more circuit controllers operable preferably through relay circuit holding devices to complete the circuit, and by one or more circuit decontrollers operable to break the circuit and de-energize the holding relays should such be employed. In the presently presented disclosure, there is incorporated in the circuit a signal circuit set or triggered for action by the first mentioned circuit and including a supplemental control means to fully complete the signal circuit upon detection of tampering with some associated mechanical structure. An important feature of the invention is the provision of a plurality of the circuit control means interrelated with the associated circuit by which sequential operation in a predetermined relationship is essential to the completion of the circuit. As a frustrating factor inhibiting the success of trial and error detection of the proper sequence, a plurality of decontrol devices are preferably employed, their operating means being interspersed with the operators of the circuit control means. Also, it is preferred that such decontrol means be arranged in the circuit to wipe out and destroy the previous effect of proper sequential operation of the circuit control devices should such have taken place.

Referring now to the first five figures of the drawings, it will be seen that the structure of the circuit controllers of the present invention may take the form of a panel or keyboard, and circuit controllers and operating buttons or keys therefor may be arranged in a single row. It will of course be understood that circular, staggered, or otherwise grouped arrangements of the circuit controllers and their actuating means may be employed, should such be desired, and meet the demands of the designer of the apparatus. In that form of construction here presented, the circuit controller comprises an elongate casing of generally rectangular cross-section including a bottom or backing plate 10, end members 11 and side walls 12. Within the side walls and end members and mounted upon the plate 10, there is provided a base block 13 extending approximately half-way up the walls and end members from the plate 10 and formed with linearly spaced cylindrical key shank receiving wells 14. Enclosing the top of the casing, there is provided a cover 15 having apertures 16 in registration with the wells 14 to receive therethrough the button end of the individual keys, the shanks of which are mounted in the wells 14 as hereinafter described.

The keys, including shanks 17, slideably fitted within the wells 14 and button ends 18 protruding through the apertures 16 of the cover, are of two separate categories. One type of key may be designated as a circuit control key, while other keys may be designated as circuit decontrol keys. The keys may be numbered, lettered or otherwise identified, and preferably such designation will be in some regular sequence other than giving any clue to which of the keys are of which category. For the purpose of the present disclosure, the keys are designated by the letters A to M, reading from left to right in Figs. 1, 2 and 3. As will be hereinafter described, the keys A, D and H are here selected as circuit control keys, while the remaining keys are circuit decontrol keys. In each instance, the keys are urged upwardly towards the top plate by coil springs 20 seated within the wells 14 and bearing against the lower ends of the key shanks 17. Also, in each instance, the keys are formed with intermediate shoulders or heads 21, the upper faces of which normally bear against the inner face of the cover 15 and are thus limited in their outward extension through said cover.

Figure 4:
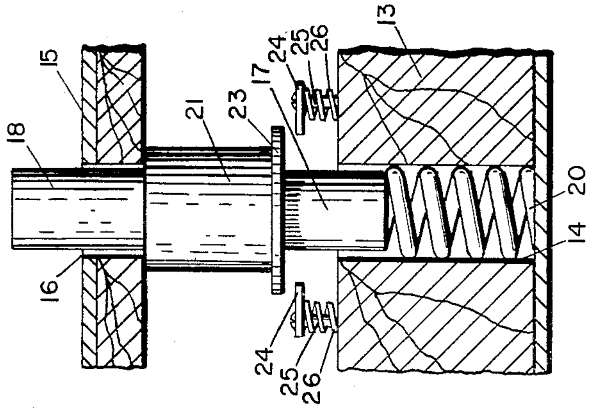
Fig. 4 is a detailed cross-sectional view through one of the control keys of the device of Fig. 1.

The circuit control keys, identified here as A, D and H are of the structure shown in detail in Fig. 4 and may be in any such number and location in the total group of keys as desired. Each control key is provided with a conductive disk 23 mounted adjacent the base or inner end of the head 21 of the key and thus comprising a jumper or switch element for completing a circuit between contacts 24 yieldably supported upon pins 25, carried by the base block 13 and urged upwardly by the springs 26. It will be understood that the keys themselves are formed of nonconductive material or are otherwise suitably insulated from the disk 23 so as to preclude current leakage therethrough when such keys are depressed to establish a circuit between the contacts 24. By this construction, it will be seen that when the circuit control keys are in their normal position as determined by the pressure exerted by their springs 20, the circuit between their contacts is broken. However, when the keys are depressed against the tension of their springs, the conductive disk 23 contacts the contacts 24, forming a conductive bridge therebetween to thus complete the circuit with respect thereto.

Figure 3:
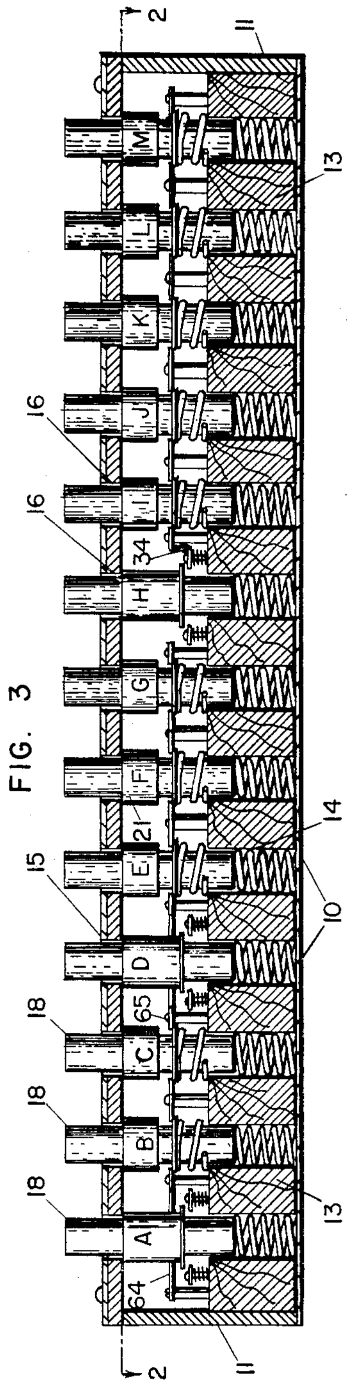
Fig. 3 is a longitudinal cross-sectional view taken on the line 3—3 of Fig. 1.
Figure 5:
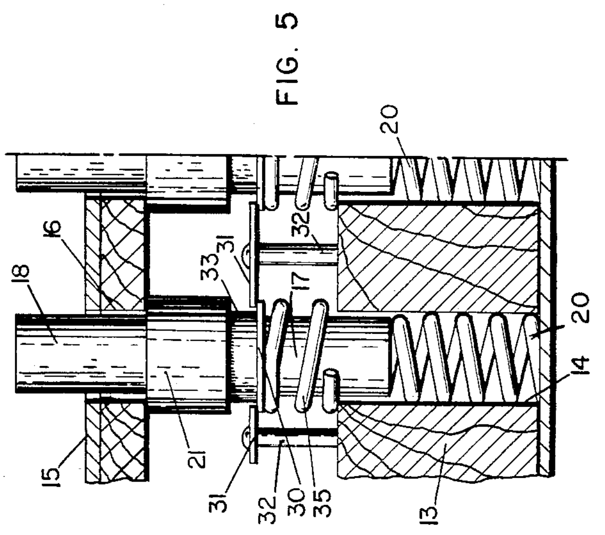
Fig. 5 is a view similar to Fig. 4 through one of the decontrol keys of Fig. 1.

As shown in Fig. 5, the circuit decontrol keys are provided with conductive disks 30 mounted in downwardly spaced relationship to the inner face of the key heads 21 and beneath spaced contacts 31 secured upon pins 32 extending upwardly from the block 13. In this case, the disks 30 may be loosely mounted upon the shanks of the keys, and springs 35 may be employed to maintain normal contact of the disks with the underside of the contacts. To insure inward movement of the disks upon depression of the keys, sleeves 33 are disposed between the inner face of the heads 21 and the upper face of the disks 30. As between adjacent decontrol keys, the contacts 31 may serve as contacts for both adjacent keys as shown in Fig. 5, thus placing the keys in series. Where decontrol keys are mounted in series next to control keys, offset contacts as shown at 34 in Fig. 3 are provided. By this arrangement, it will be seen that the decontrol keys provide for a normally closed circuit between their contacts 31 and that such circuit is broken by the depression of any one of such keys.

Figures 6, 7:
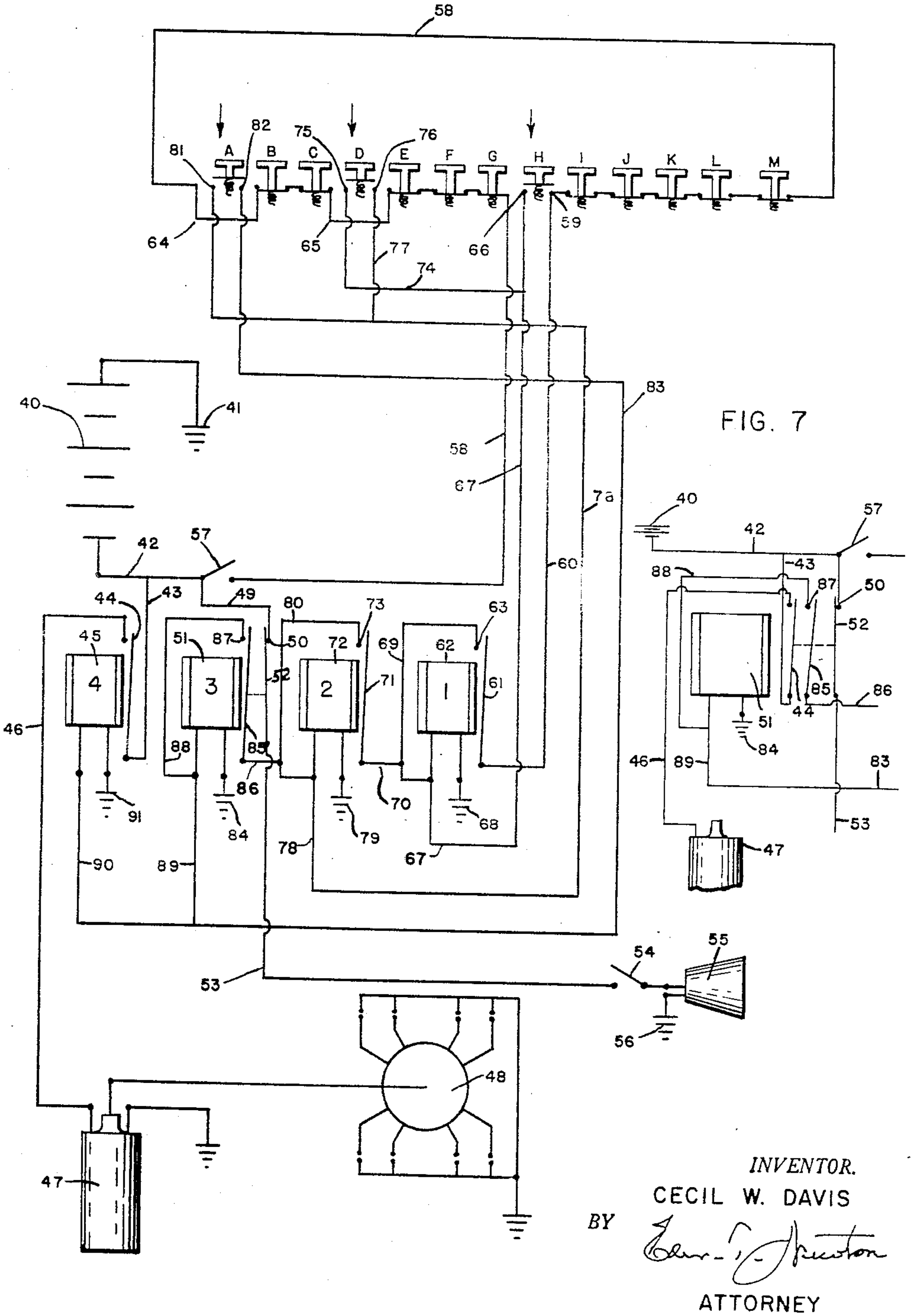
Fig. 6 is a wiring diagram of one embodiment of the system of the present invention.
Fig. 7 is a portion of the wiring diagram illustrated in Fig. 6 showing an alternate arrangement for one of the relays.

Referring now to the circuit diagram of Fig. 6 of the drawings presenting one form of electrical means for carrying out the system of the present invention, the source of electrical energy is conveniently shown by the battery 40 grounded at 41 and connected into the circuit by the conductor 42. It will of course be understood that the battery illustrated is only symbolic of some suitable source of potential which may, in the application of the invention to a motor vehicle, include the generator in combination with the conventional wiring system which provides the ignition for the internal combustion engine of the vehicle. A direct connection of the battery 40 for energizing the ignition system may be had through conductor 43, relay contact 44 associated with relay 45 (when this relay is energized), and thence by conductor 46 to such conventional means as the coil 47 and distributor 48. Since the energization of relay 45 is under control of the associated and interrelated unauthorized use prevention circuit and is normally de-energized until such circuit is activated, it will be understood that the contact 44 is normally open when the vehicle is not in operation and that the control circuit must be completed to relay 45 before the motor may be started.

Conductor 42 from battery 40 also leads by way of conductor 49, to a contact 50 associated with a relay 51. The contact arm 52 of the relay 51 is normally engaged with the contact 50 when the relay is not energized. Upon energization of the relay, the arm 52 moves to break the supply of current from the battery 40 to the arm 52. Conductor 53 leads from the contact arm 52 through switch 54 to a signal device such as the horn 55. Horn 55 is grounded at 56 to complete the circuit. The switch 54 is normally open but is adapted to be closed upon an attempted manipulation of some structure of the vehicle in an attempt to get at the wiring. Since contact arm 52 is normally energized by the battery through contact 50 when the ignition circuit is open, the closing of the switch 54 will energize the signal 55 to warn the public that the vehicle is being tampered with. As an illustration, the switch may be normally opened by the weight of the vehicle hood and thus closed should the hood be raised in an attempt to circumvent the action of the present circuit by short circuiting the wiring thereof.

Referring now to the panel and its diagram, it will be noted that all decontrol switches of keys B, C, E, F, G, I, J, K, L, and M are normally closed and are in series to supply current via a conventional key actuated switch 57 and conductors 58, 58' to a contact of one of the control switches such as contact 59 of key H.

Figure 2:
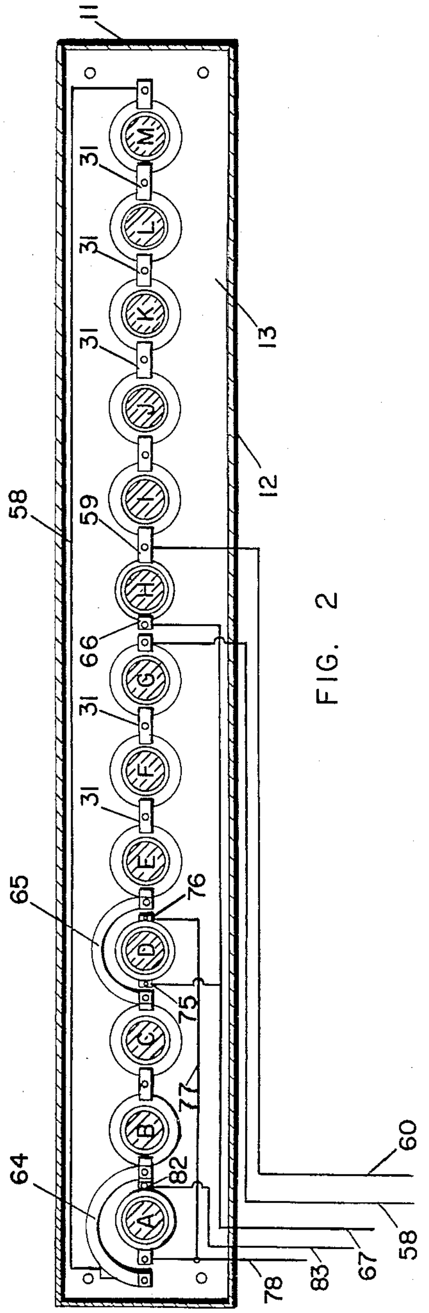
Fig. 2 is an interior view of the device of Fig. 1 as taken on the line 2—2 of Fig. 3.

The control switches of keys A, D and H are normally open with switches of keys A and D, in this instance, jumped out of the circuit by means of jumpers, such as jumpers 64 and 65, shown in Figs. 2 and 6. It is apparent to those skilled in the art that the circuit may be readily modified to alter the arrangement of control and decontrol keys and thus alter the required sequence of operation. The circuit here shown is therefore by way of illustration only and the invention is in no way limited to its specific details. In the circuit here presented, by depressing the key H, a circuit is completed from contact 59 through contact 66, conductor 67 and through relay 62 to ground 68. The closing of this circuit energizes relay 62 to close contact arm 61 to engage contact 63 and supply current from conductor 60 through conductor 69 to energize relay 62, regardless of whether or not the control switch of key H is closed.

In addition, with relay 62 energized as described above, current is supplied through conductor 70 to conductor arm 71 of relay 72 where, upon energizing of relay 72, conductor arm 71 is adapted to engage contact 73. In Fig. 6, it will be seen that with relay 62 energized, current is also supplied through conductor 69 and conductor 67 to conductor 74 which leads to contact 75 of the control switch of key D. Upon closing of this switch of key D, after energizing of relay 62, current will flow from contact 75 of control switch D to contact 76 thereof and thence through conductors 77 and 78 through relay 72 to ground 79. Thus, relay 72 is energized to close contact arm 71 against contact 73 to supply current through conductor 80 through relay 72 to ground, regardless of whether or not control switch of key D remains closed.

With relay 72 energized, current is supplied through conductors 80 and 78 to contact 81 of the control switch of key A. Upon closing of the control switch of key A, current is supplied to contact 82 and thence through conductor 83 and relay 51 to ground 84, thus energizing relay 51. Associated with relay 51 is a second contact arm 85 which has current supplied thereto from conductor 80 through conductor 86. Contact arm 85 is electrically insulated from contact arm 52, but it mechanically operates in conjunction therewith. Upon energizing of relay 51, contact arm 52 is pulled away from contact 50 to de-energize the circuit leading to horn 55. Simultaneously, contact arm 85 is closed against contact 87 to supply current through conductor 88, through relay 51 to ground 84. Further, current is supplied through conductors 89 and 90, through relay 45 to ground 91. This energizes relay 45 to close the circuit, including contact arm 44, to supply current to coil 47 of the ignition system.

In the alternate embodiment shown in Fig. 7, it will be seen that relay 45, conductor 90, ground 91 and contact arm 44 may be eliminated by providing a third contact arm 44' on relay 51. Contact arm 44' is substituted for arm 44 in the ignition circuit by being interposed in this circuit between conductor 43 and conductor 46. Since in the circuit shown in Fig. 6, relays 45 and 51 operate substantially simultaneously, the one relay shown in Fig. 7 is equivalent to the two relays shown in Fig. 6.

From the foregoing description, the operation of my device is apparent. The operator first closes switch 57 to supply current to the panel, next the operator depresses key H to close the circuit to energize relay 62. Once depressed, key H may be released since a hold-down circuit keeps this coil energized. Next, key D is depressed to energize relay 72. Relay 72 will not energize unless relay 62 has been previously energized and remains so. Thereafter, key D may be released. Relay 72 has a hold-down circuit which maintains the relay energized, once it has been energized. Next, key A is depressed, thus energizing relay 51. Thereafter, key A may be released, the ignition circuit being completed by the operation of relay 45 which is controlled by relay 51.

If during the operation of the above described sequence of keys, any one of the decontrol switches is opened by depressing a decontrol key such as M, the circuit to relay 62 is broken and hence the circuits to relay 72 and relay 51 will be broken to de-energize all relays. Further, if key D is depressed before key H, or key A is depressed before either key H or key D, neither of their respective relays will be energized since current to the relay is supplied only from the next preceding relay of the sequence. Thus, it will be seen that only after a proper sequence of keys and no decontrol keys will the ignition circuit be rendered operable to start the engine. Further, until relay 51 is energized, the horn circuit is provided with current so that the closing of switch 54 by opening of the hood will set off an alarm.

It is apparent to those skilled in the art that many variations may be made in the embodiments chosen for purpose of illustration without departing from the scope of my invention as defined by the appended claims.

I claim:

1. In a use prevention circuit having an ignition circuit, a control circuit and a source of electrical current, a series of holding relays in said control circuit operably connected so that each of said relays before the last relay in said series of relays is operable to energize the next succeeding relay in said series of relays, control switches respectively interposed in said circuit before each relay of said series of relays to control the energizing thereof, a plurality of series connected decontrol switches in said control circuit, each switch of said decontrol switches being operable to de-energize all of said relays, and an ignition circuit switch means interposed in said ignition circuit, said ignition circuit switch means being operable by said last relay of said series of relays to control said ignition circuit, an alarm circuit connected to said source of current, alarm means connected to said alarm circuit, an actuating switch for actuating said alarm circuit to actuate said alarm means, and a deactuation switch controlled by said last relay of said series of relays for rendering said alarm circuit inoperative when said last relay is energized.

2. A use prevention device comprising a plurality of keys arranged in juxtaposition, a plurality of control switches operable respectively by said keys and being normally electrically open, a source of current, conductor means connecting the first switch, said control switches to said source of electrical current, a plurality of relays, conductor means joining the first relay of said relays to said first switch, said first relay being energized by current from said first switch upon the closing thereof and remaining energized after opening thereof, conductor means connecting a second switch of said control switches to said first relay, to receive current therefrom when said first relay is energized, conductor means joining the second of said relays to said second switch, said second relay being energized by current from said second switch upon the closing thereof and remaining energized after opening of said second switch so long as said first relay is energized, an ignition energizing switch normally open and closeable upon the energizing of the third relay of said relays, conductor means connecting said third switch to said second relay to receive current therefrom when said second relay is energized, conductor means joining said third relay to said third switch, said third relay being energized by current from said third switch upon the closing thereof and remaining energized after opening of said third switch so long as said third relay is closed, an alarm circuit connected to said source of current, alarm means connected to said alarm circuit, an actuating switch for actuating said alarm circuit to actuate said alarm means and a deactuation switch controlled by said last relay of said series of relays for rendering said alarm circuit inoperative when said third relay is energized.

3. A use prevention device comprising a plurality of keys, a plurality of control switches operable respectively by some of said keys, a plurality of decontrol switches operable respectively by other of said keys, said control switches being normally electrically open, said decontrol switches being normally electrically closed, a source of electrical power, conductor means connecting said decontrol switches in series with each other to said source of electrical power, conductor means connecting the first of said control switches to said decontrol switches for receiving a supply of current through said decontrol switches from said source of electrical power when all of said decontrol switches are closed, a plurality of relays, conductor means joining the first relay of said relays to said first switch of said control switches, said first relay to be energized by current from said first switch upon the closing thereof and to remain energized after opening of said first switch so long as a supply of current is supplied through said decontrol switches, conductor means connecting the second switch of said control switches to the first relay to receive current therefrom when said first relay is energized, conductor means joining the second relay of said relays to said second switch of said switches, said second relay to be energized by current from said first relay upon the closing of said second switch and to remain energized after opening of said second switch so long as said first relay is energized, an ignition energizing switch normally open and closeable upon the energizing of the third relay of said relays, conductor means connecting the third switch of said control switches to said second relay to receive current therefrom when said second relay is energized, conductor means joining said third relay to said third switch, said third relay to be energized by current from said third switch upon the closing thereof and to remain energized after opening of said third switch so long as said second relay is closed, an alarm circuit connected to said source of power, alarm means connected to said alarm circuit, an actuating switch for actuating said alarm circuit to actuate said alarm means, and a deactuation switch controlled by said last relay of said series of relays for rendering said alarm circuit inoperative when said third relay is energized.

4. In a use prevention circuit including an ignition circuit, a control circuit and a source of electrical current, a series of relays in said control circuit operably connected so that each of said relays before the last relay in said series of relays is operable to energize the next succeeding relay in said series of relays, control switch means interposed in said circuit between certain of the relays of said series of relays to control the energizing of certain relays of said series of relays, an ignition circuit switch means interposed in said ignition circuit, said ignition circuit switch means being operable by said last relay of said series of relays to control said ignition circuit, an alarm circuit connected to said source of current, alarm means connected to said alarm circuit, an actuating switch for actuating said alarm circuit to actuate said alarm means, and a deactuation switch controlled by said last relay of said series of relays for rendering said alarm circuit inoperative when said last relay is energized.

5. In a use prevention circuit having an ignition circuit, a control circuit and a source of electrical current, a series of relays in said control circuit operably connected so that each of said relays before the last relay in said series of relays is operable to energize the next succeeding relay in said series of relays, control switch means interposed in said circuit between certain of the relays of said series of relays to control the energizing of certain relays of said series of relays, decontrol switch means in said control circuit operable to de-energize all of said relays, an ignition circuit switch means interposed in said ignition circuit, said ignition circuit switch means being operable by said last relay of said series of relays to control said ignition circuit, an alarm circuit connected to said source of current, an alarm means operable by said alarm circuit, and a switch means associated with said relays and electrically opened upon energizing of a certain relay of said series of relays.

6. The circuit defined in claim 5 wherein said decontrol switch means includes a plurality of decontrol switches arranged in series and interposed in said control circuit between said source of electrical current and the first relay of said series of relays.

References Cited in the file of this patent

UNITED STATES PATENTS

| | | |
|---|---|---|
| 1,139,757 | Fassett | May 18, 1915 |
| 1,290,644 | Nelson | Jan. 7, 1919 |
| 2,225,715 | Schneider | Dec. 24, 1940 |
| 2,436,809 | Joel | Mar. 2, 1948 |
| 2,517,619 | Ainley | Aug. 8, 1950 |
| 2,561,076 | Tassin | July 17, 1951 |